(12) United States Patent
Lei et al.

(10) Patent No.: US 10,620,156 B2
(45) Date of Patent: Apr. 14, 2020

(54) METAL NANOPARTICLES/NANOCELLULOSE COMPOSITES-BASED NON-ENZYMATIC ELECTROCHEMICAL GLUCOSE SENSOR AND PREPARATION METHOD THEREOF

(71) Applicant: Energy Research Institute Co., Ltd, Henan Academy of Sciences, Zhengzhou (CN)

(72) Inventors: Tingzhou Lei, Zhengzhou (CN); Lili Dong, Zhengzhou (CN); Xiuqiang Zhang, Zhengzhou (CN); Suxia Ren, Zhengzhou (CN); Qinglin Wu, Baton Rouge, LA (US); Gaofeng Chen, Zhengzhou (CN); Guihua Yan, Zhengzhou (CN)

(73) Assignee: Energy Research Institute Co., Ltd, Henan Academy of Sciences, Zhengzhou (CN)

( * ) Notice: Subject to any disclaimer, the term of this patent is extended or adjusted under 35 U.S.C. 154(b) by 421 days.

(21) Appl. No.: 15/613,318

(22) Filed: Jun. 5, 2017

(65) Prior Publication Data
US 2017/0276640 A1 Sep. 28, 2017

Related U.S. Application Data

(63) Continuation of application No. PCT/CN2016/075921, filed on Sep. 3, 2016.

(30) Foreign Application Priority Data
Dec. 17, 2015 (CN) .......................... 2015 1 09515192

(51) Int. Cl.
*G01N 27/416* (2006.01)
*G01N 27/327* (2006.01)
(Continued)

(52) U.S. Cl.
CPC .......... *G01N 27/416* (2013.01); *C08B 15/02* (2013.01); *C08B 15/06* (2013.01); *G01N 27/301* (2013.01);
(Continued)

(58) Field of Classification Search
CPC .. G01N 27/416; G01N 27/308; G01N 27/301; G01N 27/3278; G01N 27/30; G01N 27/26; C08B 15/02; C08B 15/06
See application file for complete search history.

(56) References Cited

PUBLICATIONS

F. Lam, et al. "Catalysis using gold nanoparticles decorated on nanocrystalline cellulose", Nanoscale, 4(3), p. 997-1002 (Year: 2012).*

(Continued)

*Primary Examiner* — J. Christopher Ball
(74) *Attorney, Agent, or Firm* — Wayne & Ken, LLC; Tony Hom (57) ABSTRACT

The invention discloses a metal nanoparticles/nanocellulose composites-based non-enzymatic electrochemical glucose sensor, comprising a three-electrode system composed of a working electrode, a counter electrode, and a reference electrode. The surface of the working electrode is coated with a metal nanoparticles/nanocellulose composites. The surface of the nanocellulose is modified with a strong cationic conducting polymer. The invention promotes the sensitivity and selectivity of glucose sensing with the linear range of 4 µM-15 mM and the detection limit of 1.4 µM. Therefore, the sensor possesses high sensitivity, high response speed, stable performance and high anti-interference ability. The preparation method of the metal nanoparticles/nanocellulose composites-based non-enzymatic electrochemical glucose sensor is simple and the cost is low. And enzyme is introduced into the preparation process.

3 Claims, 5 Drawing Sheets

(51) Int. Cl.
*C08B 15/06* (2006.01)
*C08B 15/02* (2006.01)
*G01N 27/30* (2006.01)

(52) U.S. Cl.
CPC ....... *G01N 27/308* (2013.01); *G01N 27/3278* (2013.01)

(56) References Cited

PUBLICATIONS

M.J. Bonné, et al. ("Thin-Film Modified Electrodes with Reconstituted Cellulose-PDDAC Films for the Accumulation and Detection of Trichlosan", Journal of Physical Chemistry, C, 112(7), p. 2660-2666, Feb. (Year: 2008).*

Leung, et al. "Characteristics and Properties of Carboxylated Cellulose Nanocrystals Prepared from a Novel One-Step Procedure", Small, 7(3): p. 302-305, Feb. (Year: 2011).*

\* cited by examiner

METAL NANOPARTICLES/NANOCELLULOSE COMPOSITES-BASED NON-ENZYMATIC ELECTROCHEMICAL GLUCOSE SENSOR AND PREPARATION METHOD THEREOF

TECHNICAL FIELD

The present invention relates to the field of electrochemical sensor, and more specifically, to a metal nanoparticles/nanocellulose composites-based non-enzymatic electrochemical glucose sensor and a preparation method thereof.

BACKGROUND OF THE INVENTION

Glucose is a main characteristic compound in life process. The detection and analysis of glucose have important significance to human health and diagnosis, treatment and control of diseases.

Currently, the detection methods for glucose mainly comprise chromatography, differential spectrophotometric method and colorimetric method. However, these existing detection methods have disadvantages of low sensitivity, labor-consuming and time-consuming. The electrochemical sensor has becomes a competitive method for glucose detection due to the advantages of high sensitivity, good selectivity, short response time, simple operation and low cost. According to whether to use the enzyme, the electrochemical glucose sensor could be divided into enzymatic and non-enzymatic electrochemical glucose sensor. Enzymatic electrochemical glucose sensor are highly selective and sensitive, but the disadvantages of low stability, poor detection reproducibility, low activity of immobilized enzyme and other problems caused by the property of the enzyme itself limit the application of enzymatic electrochemical glucose sensor in the detection of glucose.

In preparation of non-enzymatic electrochemical glucose sensor, the electrocatalytic activity of electrode material is of great importance for electrochemical oxidation of glucose. Studies found that some noble metal nanoparticles, which have high activity to catalytic oxidation of glucose, also have good biocompatibility. Therefore, noble metal nanoparticles can be used to prepare electrode material of non-enzymatic electrochemical glucose sensor. To improve the stability and utilization rate of metal nanoparticles, metal nanoparticles loaded on carriers are usually taken as composite electrode material. In the prior art, common carrier materials are inorganic material such as carbon nanotubes, graphene or carbon nanofibers. However, these materials are non-renewable and too costly. Nanocellulose is a reproducible biologic material, and are widely existed in nature. Nanocellulose has advantages of uniform morphology and size, controllable surface property, good biocompatibility, good biodegradability and low cost etc. The nanocellulose possess a good colloidal stability in water due to the electron-rich feature of their surface. The nanocellulose also tend to form an open porous network structures through inter-particle hydrogen bonds. These properties render nanocellulose suitable to serve as support material for metal nanoparticles. Currently, the application of nanocellulose supported metal nanoparticles in non-enzymatic glucose electrochemical sensing have not been reported so far.

SUMMARY OF THE INVENTION

The purpose of the invention is to provide a metal nanoparticles/nanocellulose composites-based non-enzymatic electrochemical glucose sensor, and another purpose of the invention is to provide corresponding preparation method.

Based on above purposes, the invention adopts the following technical scheme:

The metal nanoparticles/nanocellulose composites-based non-enzymatic electrochemical glucose sensor was composed of a three-electrode system consisting of a working electrode, a counter electrode, and a reference electrode. The surface of the working electrode is coated with a metal nanoparticles/nanocellulose composites, and the surface of nanocellulose (CNCs) is modified with a strong cationic conducting polymer.

The loading amount of the metal nanoparticles is 1%-20%, and the loading amount of the metal nanoparticles is a ratio between the weight of the metal nanoparticles and the total weight of the metal nanoparticles/nanocellulose composites.

The rod-shaped nanocellulose is 150-200 nm long with a diameter of 10-20 nm, and the surface of nanocellulose is negatively charged.

The strong cationic conducting polymer is poly (diallyldimethylammonium chloride) (PDDA).

The metal nanoparticles is Au nanoparticles or Pt nanoparticles, and the particle size is 2-10 nm.

The metal nanoparticle is obtained by a metal precursor, and the metal precursor is $AuCl_4^-$ or $PtCl_6^{2-}$.

The working electrode is a glassy carbon electrode. The counter electrode is a platinum wire or a platinum sheet. And the reference electrode is Ag/AgCl electrode.

A preparation method of the metal nanoparticles/nanocellulose composites-based non-enzymatic electrochemical glucose sensor, comprising following steps:

(a) carrying out oxidation treatment on microcrystalline cellulose by ammonium persulfate, and obtaining 0.1 wt % nanocellulose suspensions through dialysis, homogeneity and rotary evaporation;

(b) mixing 500 ml of nanocellulose suspensions obtained in step (a) with 2.5-5.0 g of 20 wt % strong cationic conducting polymer, and ultrasonic dispersing for 1-2 hour and stirring for 12-24 hours; then adding 2.5-5.0 g of sodium chloride to the suspensions and continually stirring for 12-24 hours; centrifugal washing the suspensions for 5-8 times to obtaining 0.05 wt % strong cation conducting polymer-nanocellulose suspensions;

(c) mixing 200 ml strong cationic conducting polymer-nanocellulose suspension obtained in step (b) with 1.01-25.00 ml anion metal precursor aqueous solution, and the metal content in the metal precursor water solution is 1 mg/ml; ultrasonic dispersing the suspensions for 1-2 hour, and dropwise adding excessive $NaBH_4$ aqueous solution to the suspensions under stirring; dialyzing the suspensions to obtaining metal nanoparticles/nanocellulose composites;

(d) polishing and ultrasonic washing the working electrode; coating the surface of the working electrode with the metal nanoparticles/nanocellulose composites obtained in step (c) and drying the working electrode to obtaining the metal nanoparticles/nanocellulose composites modified working electrode;

(e) composing metal nanoparticles/nanocellulose composites-based non-enzymatic electrochemical glucose sensor with the metal nanoparticles/nanocellulose composites obtained in step (d) modified working electrode, the counter electrode and the reference electrode.

In a refinement, the process for step (a) comprises: adding 5 g of microcrystalline cellulose into 300-500 ml ammonium persulfate solution, and the concentration of the ammonium persulfate solution is 1-2 mol/l; and stirring for 6-16 hours under 60-70° C. at a stirring speed of 500-600 r/min.

In a refinement, in step (c), the metal precursor is $AuCl_4^-$ or $PtCl_6^{2-}$; the concentration of the $NaBH_4$ solution is 0.05 mol/l, and the dropwise adding quantity is 30-60 ml; and the dialysis is completed when an electric conductivity of dialysate is constant.

Compared with the prior art, the invention has following beneficial effects:

(1) The surface of the working electrode of the electrochemical glucose sensor was coated with metal nanoparticles/nanocellulose composites. The nanocellulose with excellent biocompatibility and low price which was modified with strong cationic conducting polymer was adopted as supporting material, and the metal nanoparticles with small particle size was further loaded onto the supporting material for constructing the nanoparticles/nanocellulose composites. The working electrode coated with the nanoparticles/nanocellulose composites can provides larger electrochemical active surface area, thereby enhancing the sensitivity and selectivity of glucose sensing. Therefore, the electrochemical glucose sensor possesses high sensitivity, stability, response speed and anti-interference ability. The linear detection of the electrochemical glucose sensor ranges from 4 μM to 15 mM, with a detection limit of 1.4 μM.

(2) In the preparation method of the present invention, the strong cationic conducting polymer was adsorbed on the surface of the nanocellulose by virtue of the electrostatic forces, which making the nanocellulose uniformly positively charged. Meanwhile, the conductivity of nanocellulose was increased. The in-situ deposition of metal nanoparticles with small particle size was realized by adding excessive $NaBH_4$ solution, via the electrostatic adsorption between negative metal precursor and positively charged cationic conducting polymer modified nanocellulose. The metal nanoparticles were distributed evenly and highly dispersed on the surface of the nanocellulose to provide larger electrochemical active surface area, thereby enhancing the sensitivity and selectivity of glucose sensing. The preparation method was simple and the cost is low. And no enzyme was introduced into the preparation process.

DETAILED DESCRIPTION OF THE INVENTION

The invention is further described in combination with drawings and embodiments.

Embodiment 1

A metal nanoparticles/nanocellulose composites-based non-enzymatic electrochemical glucose sensor was composed of a three-electrode system consisting of a glassy carbon electrode, a platinum wire and a Ag/AgCl electrode. The surface of the glassy carbon electrode was coated with the metal nanoparticles/nanocellulose composites. The rod-shaped nanocellulose was negatively charged by modifying with poly (diallyldimethylammonium chloride) (PDDA), with the length of 150-200 nm and the diameter of 10-20 nm. The metal nanoparticles in the composites is Au nanoparticles, with the particle size distribution range of 2.6-4.9 nm, and the average particle size of 3.75 nm. The loading capacity of Au nanoparticles was 5%.

The preparation method comprises:

(1) adding 5 g microcrystalline cellulose into 350 ml of 1 mol/l ammonium persulfate solution, and stirring for 16 hours under 60° C. at a stirring speed of 600 r/min; placing the suspensions in a dialysis tubing to dialyze until the suspension conductivity reached a stable value; carrying out homogeneity on the suspensions after dialyzing for 5 times under 25000 Psi; then carrying out rotary evaporation on the suspensions under 56° C. to obtaining 0.1 wt % nanocellulose (CNCs) suspensions;

(2) mixing 500 ml CNCs suspensions obtained in step (1) with 3.0 g of 20 wt % PDDA, and ultrasonic dispersing for 1 hour and stirring for 12 hours; adding 3.0 g of sodium chloride to the suspensions and continually stirring for 24 hours; centrifuging the suspensions for 20 min at a rotate speed of 17000 r/min for 5 times, and dispersing the suspensions with deionized water to obtaining 0.05 wt % PDDA-CNCs suspensions;

(3) mixing 200 ml PPDA-CNCs suspension obtained in step (2) with 5.26 ml of 1 mg Au/mL chloroauric acid aqueous solution, and ultrasonic dispersing for 1.5 hours; dropwise adding 40 ml 0.05 mol/l $NaBH_4$ solution to the suspension under magnetic stirring at a rotate speed of 500 r/min, and continually stirring for 2 hours; placing the suspensions in a dialysis tubing to dialyze until the suspension conductivity reached a stable value to obtaining Au/PDDA-CNCs composites;

(4) polishing the glassy carbon electrode with 0.5 μm and 0.05 μm alumina slurry, and ultrasonic washing with deionized water and ethyl alcohol sequentially; modifying the glassy carbon electrode by coating 5 μL of Au/PDDA-CNCs composites (the content is 1 mg/mL) obtained in step (3) with pipette; drying the electrode by infrared lamp to obtaining the glassy carbon electrode modified by Au/PDDA-CNCs compound;

(5) composing Au/PDDA-CNCs composites-based non-enzymatic electrochemical glucose sensor by taking the Au/PDDA-CNCs composites obtained in step (4) modified glassy carbon electrode as the working electrode, a platinum wire as the counter electrode, and a Ag/AgCl electrode as the reference electrode.

Embodiment 2

A metal nanoparticles/nanocellulose composites-based non-enzymatic electrochemical glucose sensor was composed of a three-electrode system consisting of a glassy carbon electrode, a platinum wire and a Ag/AgCl electrode. The surface of the glassy carbon electrode was coated with the metal nanoparticles/nanocellulose composites. The rod-shaped nanocellulose was negatively charged by modifying with poly (diallyldimethylammonium chloride) (PDDA), with the length of 150-200 nm and the diameter of 10-20 nm. The metal nanoparticles in the composites is Pt nanoparticles, with the particle size distribution range of 3.8-9.7 nm, and the average particle size of 6.1 nm. The loading capacity of Pt nanoparticles was 10%.

The preparation method comprises:

(1) adding 5 g microcrystalline cellulose into 400 ml of 1 mol/l ammonium persulfate solution, and stirring for 6 hours under 70° C. at a stirring speed of 600 r/min; placing the suspensions in a dialysis tubing to dialyze until the suspension conductivity reached a stable value; carrying out homogeneity on the suspensions after dialyzing for 5 times under 25000 Psi; then carrying out rotary evaporation on the suspensions under 56° C. to obtaining 0.1 wt % nanocellulose (CNCs) suspensions;

(2) mixing 500 ml CNCs suspensions obtained in step (1) with 4.0 g of 20 wt % PDDA, and ultrasonic dispersing for 1 hour and stirring for 24 hours; adding 4.0 g of sodium chloride to the suspensions and continually stirring for 24 hours; centrifuging the suspensions for 20 min at a rotate speed of 17000 r/min for 5 times, and dispersing the suspensions with deionized water to obtaining 0.05 wt % PDDA-CNCs suspensions;

(3) mixing 200 ml PPDA-CNCs suspension obtained in step (2) with 11.11 ml of 1 mg Pt/mL chloroplatinic acid aqueous solution, and ultrasonic dispersing for 2 hours; dropwise adding 50 ml 0.05 mol/l $NaBH_4$ solution to the suspension under magnetic stirring at a rotate speed of 500 r/min, and continually stirring for 2 hours; placing the suspensions in a dialysis tubing to dialyze until the suspension conductivity reached a stable value to obtaining Pt/PDDA-CNCs composites;

(4) polishing the glassy carbon electrode with 0.5 μm and 0.05 μm alumina slurry, and ultrasonic washing with deionized water and ethyl alcohol sequentially; modifying the glassy carbon electrode by coating 5 μL of Pt/PDDA-CNCs composites (the content is 1 mg/mL) obtained in step (3) with pipette; drying the electrode by infrared lamp to obtaining the glassy carbon electrode modified by Pt/PDDA-CNCs compound; (5) composing Pt/PDDA-CNCs composites-based non-enzymatic electrochemical glucose sensor by taking the Pt/PDDA-CNCs composites obtained in step (4) modified glassy carbon electrode as the working electrode, a platinum wire as the counter electrode, and a Ag/AgCl electrode as the reference electrode.

Embodiment 3

A metal nanoparticles/nanocellulose composites-based non-enzymatic electrochemical glucose sensor was composed of a three-electrode system consisting of a glassy carbon electrode, a platinum wire and a Ag/AgCl electrode. The surface of the glassy carbon electrode was coated with the metal nanoparticles/nanocellulose composites. The rod-shaped nanocellulose was negatively charged by modifying with poly (diallyldimethylammonium chloride) (PDDA), with the length of 150-200 nm and the diameter of 10-20 nm. The metal nanoparticles in the composites is Au nanoparticles, with the particle size distribution range of 2.2-3.9 nm, and the average particle size of 2.9 nm. The loading capacity of Pt nanoparticles was 1%.

For the preparation method, the differences with embodiment 1 are 300 ml of 1 mol/l ammonium persulfate solution in step (1), 2.5 g of 20 wt % PDDA, 2.5 g of sodium chloride, and continually stirring for 12 hours in step (2), 1.01 ml of 1 mgAu/mL chloroauric acid solution, 30 ml of $NaBH_4$ solution, and ultrasonic dispersing for 1 hour in step (3). And other steps are of the same with embodiment 1.

Embodiment 4

A metal nanoparticles/nanocellulose composites-based non-enzymatic electrochemical glucose sensor was composed of a three-electrode system consisting of a glassy carbon electrode, a platinum wire and a Ag/AgCl electrode. The surface of the glassy carbon electrode was coated with the metal nanoparticles/nanocellulose composites. The rod-shaped nanocellulose was negatively charged by modifying with poly (diallyldimethylammonium chloride) (PDDA), with the length of 150-200 nm and the diameter of 10-20 nm. The metal nanoparticles in the composites is Pt nanoparticles, with the particle size distribution range of 6.8-16.3 nm, and the average particle size of 12.4 nm. The loading capacity of Pt nanoparticles was 20%.

For the preparation method, the differences with embodiment 2 are 500 ml of 1 mol/l ammonium persulfate solution in step (1), 5.0 g of 20 wt % PDDA, 5.0 g of sodium chloride, and ultrasonic dispersing for 2 hours in step (2), 25 ml of 1 mg Pt/mL chloroplatinic acid solution, and 60 ml of $NaBH_4$ solution in step (3). And other steps are of the same with embodiment 2.

Embodiment 5

It is found that the obtained compound has good dispersion and no agglomeration by observing the metal nanoparticles/nanocellulose composites of embodiments 1-4 from transmission electron microscope.

Figure 1:
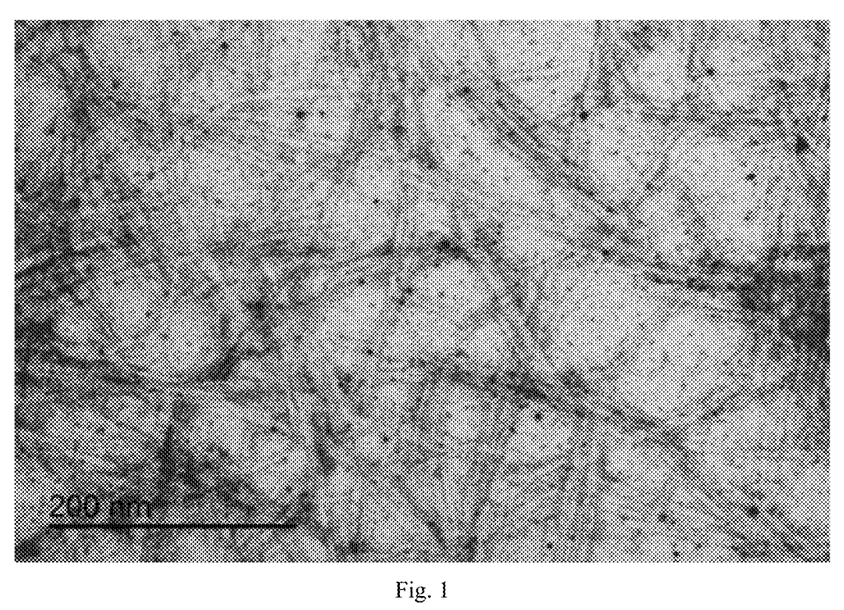
FIG. 1 is a transmission electron microscopy image of Au/PDDA-CNCs composites of embodiment 1.

FIG. 1 is a transmission electron microscope image of metal nanoparticles/nanocellulose composites of embodiment 1. As shown in FIG. 1, the CNCs were 150-200 nm in length and 10-20 nm in diameter. The particle size distribution range of Au nanoparticles was 2.6-4.9 nm, with the average particle size of 3.7 nm.

Figure 4:
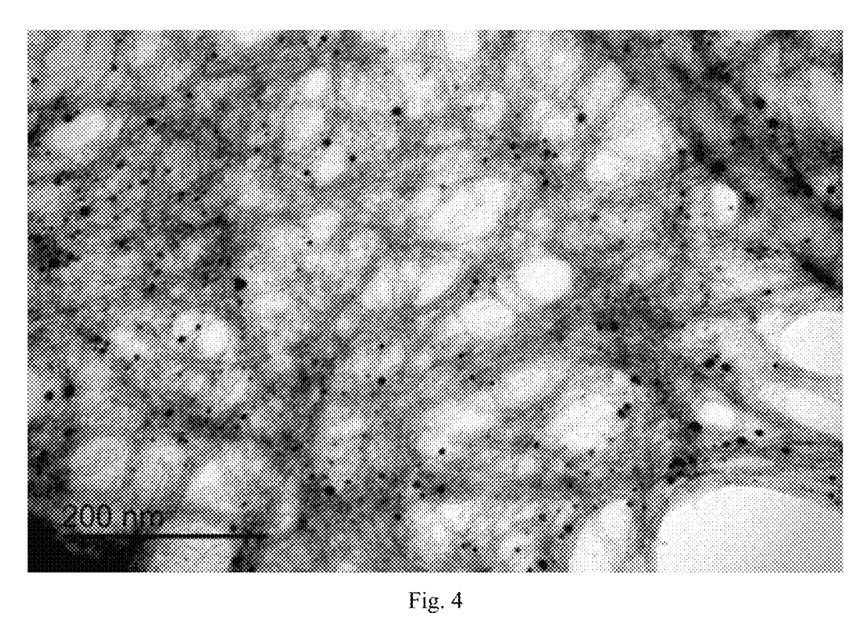
FIG. 4 is a transmission electron microscope image of Pt/PDDA-CNCs composites of embodiment 2.

FIG. 4 is a transmission electron microscope image of metal nanoparticles/nanocellulose composites of embodiment 2. As shown in FIG. 4, the CNCs were 150-200 nm in length and 10-20 nm in diameter. The particle size distribution range of Pt nanoparticles was 3.8-9.7 nm, with the average particle size of 6.1 nm.

Embodiment 6: Performance Test 6.1 Electrochemical Testing of Non-Enzymatic Electrochemical Glucose Sensor of Embodiment 1

Figure 2:
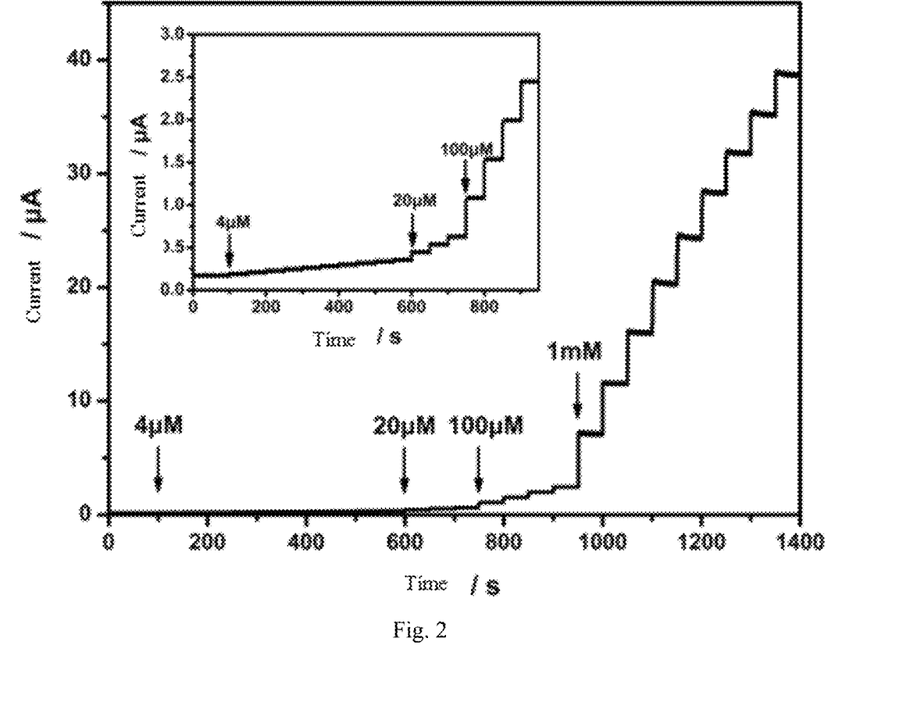
FIG. 2 shows the i-t curves of embodiment 1.
Figure 3:
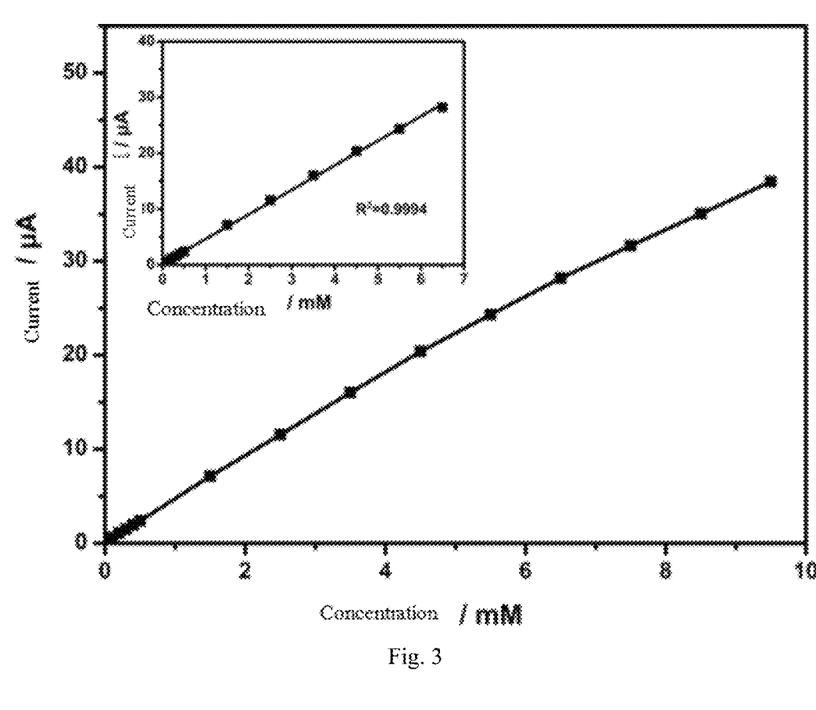
FIG. 3 shows the linear relationship diagram between a response current and glucose concentration.

Testing method: the electrochemical testing was performed on a electrochemical workstation by i-t operation mode at an applied potential of 0.2 V in 30 mL of 0.1M sodium hydroxide solution under 200 rpm magnetic stirring; the response current signals were recorded by adding a certain concentration of glucose at intervals of 50 s; as shown in FIG. 2 and FIG. 3, the time for reaching steady-state current after adding of glucose was less than 5 s, indicating that the electrochemical glucose sensor can detect glucose rapidly and sensitively.

As shown in FIG. 2 and FIG. 3, the non-enzymatic electrochemical glucose sensor of embodiment 1 exhibited the glucose sensing ability with a linear range of 4 μM-9.5 mM, high sensitivity of 62.8 μA mM$^{-1}$ cm$^{-2}$, a low detection limit of 1.4 μM (S/N=3) (related coefficient is 0.9994). It can be seen that the non-enzymatic electrochemical glucose sensor of embodiment 1 has wide detection linear range, high sensitivity, low detection limit for glucose sensing.

Figure 5:
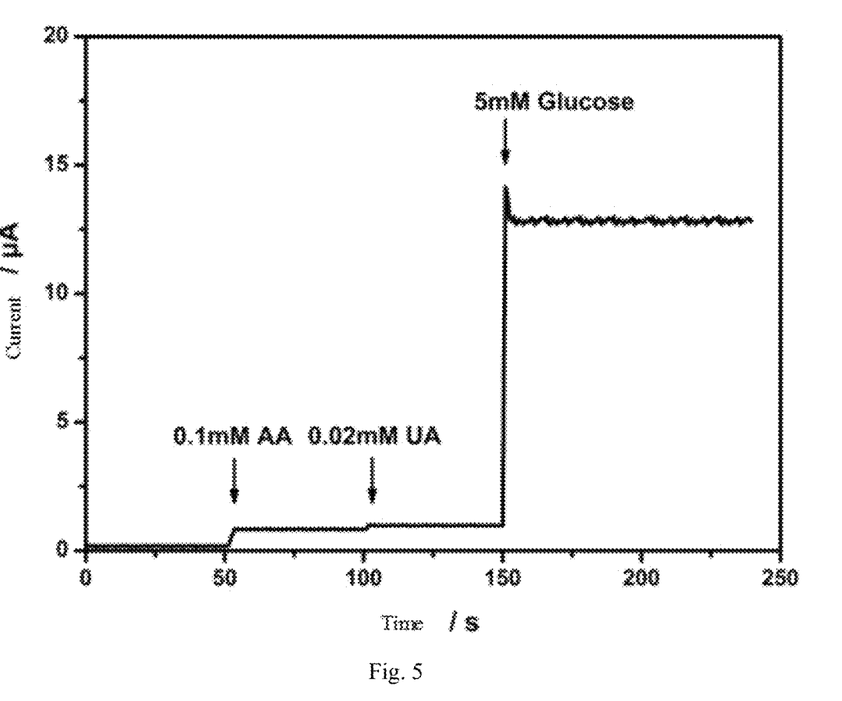
FIG. 5 shows the i-t curve under interfering substance of embodiment 2.

6.2 Selectivity of Non-Enzymatic Electrochemical Glucose Sensor on Glucose Detection of Embodiment 2 Under Interference Testing method: the electrochemical testing was performed on a electrochemical workstation by i-t operation mode at an applied potential of 0.2 V in 30 mL of 0.1M sodium hydroxide solution under 200 rpm magnetic stirring;

the response current signals were recorded by adding a certain concentration of ascorbic acid, uric acid and glucose at intervals of 50 s, as shown in FIG. 5.

As shown in FIG. 5, the non-enzymatic electrochemical glucose sensor of embodiment 2 showed very small response current on ascorbic acid and uric acid. The response current of ascorbic acid and uric acid are negligible compared with that of glucose, suggesting the high selectivity of embodiment 2 for glucose detection.

What is claimed is:

1. A preparation method of a metal nanoparticles/nanocellulose composites-based non-enzymatic electrochemical glucose sensor, comprising:
    (1) carrying out oxidation treatment on microcrystalline cellulose by ammonium persulfate, and obtaining 0.1 wt % nanocellulose suspensions through dialysis, homogeneity and rotary evaporation;
    (2) mixing 500 ml of nanocellulose suspensions obtained in step (1) with 2.5-5.0 g of 20 wt % strong cationic conducting polymer, and ultrasonic dispersing for 1-2 hour and stirring for 12-24 hours; then adding 2.5-5.0 g of sodium chloride to the suspensions and continually stirring for 12-24 hours; centrifugal washing the suspensions for 5-8 times to obtaining 0.05 wt % strong cation conducting polymer-nanocellulose suspensions;
    (3) mixing 200 ml of strong cationic conducting polymer-nanocellulose suspension obtained in step (2) with 1.01-25.00 ml anion metal precursor aqueous solution, and the metal content in the metal precursor water solution is 1 mg/ml; ultrasonic dispersing the suspensions for 1-2 hour, and dropwise adding excessive $NaBH_4$ aqueous solution to the suspensions under stirring; dialyzing the suspensions to obtaining metal nanoparticles/nanocellulose composites;
    (4) polishing and ultrasonic washing the working electrode; coating the surface of the working electrode with the metal nanoparticles/nanocellulose composites obtained in step (3) and drying the working electrode to obtaining the metal nanoparticles/nanocellulose composites modified working electrode;
    (5) composing metal nanoparticles/nanocellulose composites-based non-enzymatic electrochemical glucose sensor with the metal nanoparticles/nanocellulose composites obtained in step (4) modified working electrode, the counter electrode and the reference electrode.

2. The preparation method of the metal nanoparticles/nanocellulose composites-based non-enzymatic electrochemical glucose sensor of claim 1, wherein the process for step (1) further comprising: adding 5 g of microcrystalline cellulose into 300-500 ml ammonium persulfate solution, and the concentration of the ammonium persulfate solution is 1-2 mol/l; and stirring for 6-16 hours under 60-70° C. at a stirring speed of 500-600 r/min.

3. The preparation method of the metal nanoparticles/nanocellulose composites-based non-enzymatic electrochemical glucose sensor of claim 1, wherein in step (3), the metal precursor is $AuCl_4^-$ or $PtCl_6^{2-}$; the concentration of the $NaBH_4$ solution is 0.05 mol/l, and the dropwise adding quantity is 30-60 ml; and the dialysis is completed when an electric conductivity of dialysate is constant.

* * * * *